United States Patent
Dearing et al.

(10) Patent No.: US 7,520,691 B2
(45) Date of Patent: Apr. 21, 2009

(54) PROTECTED STABILIZER LINK OR TIE ROD AND BALL RACE PROTECTING CAP

(75) Inventors: Daniel Dearing, Centennial Northville, MI (US); Michael Cole, Centennial Northville, MI (US); Ryan McBroom, Centennial Northville, MI (US)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 570 days.

(21) Appl. No.: 10/875,834

(22) Filed: Jun. 24, 2004

(65) Prior Publication Data

US 2005/0286969 A1 Dec. 29, 2005

(51) Int. Cl.
*F16C 11/00* (2006.01)
*F16D 1/12* (2006.01)

(52) U.S. Cl. .................. 403/135; 403/133; 403/134; 280/93.51

(58) Field of Classification Search ......... 403/133–135, 403/122, 10, 23, 50–51; 280/93.51, 93.511, 280/93.502
See application file for complete search history.

(56) References Cited

U.S. PATENT DOCUMENTS

| | | | | |
|---|---|---|---|---|
| 2,745,075 A | * | 5/1956 | Simpkins et al. | 439/125 |
| 2,876,029 A | | 3/1959 | Latzen | |
| 2,910,316 A | | 10/1959 | Dier | |
| 3,058,765 A | * | 10/1962 | Thomas | 403/133 |
| 3,225,420 A | * | 12/1965 | Sullivan, Jr. | 29/898.043 |
| 3,430,995 A | * | 3/1969 | Herbenar et al. | 403/51 |
| 4,577,987 A | | 3/1986 | Buhl et al. | |
| 4,679,958 A | * | 7/1987 | Mizusawa et al. | 403/143 |
| 4,758,110 A | * | 7/1988 | Ito | 403/140 |
| 4,954,006 A | * | 9/1990 | Suzuki et al. | 403/135 |
| 5,011,321 A | * | 4/1991 | Kidokoro | 403/140 |
| 5,492,427 A | | 2/1996 | Ersoy et al. | |
| 5,529,316 A | * | 6/1996 | Mattila | 280/93.51 |
| 5,613,792 A | * | 3/1997 | Terada et al. | 403/131 |
| 5,641,235 A | * | 6/1997 | Maughan et al. | 403/133 |
| 5,713,689 A | * | 2/1998 | Pazdirek et al. | 403/135 |
| 5,885,022 A | * | 3/1999 | Maughan et al. | 403/135 |
| 6,287,040 B1 | | 9/2001 | Fischer | |
| 6,505,989 B1 | * | 1/2003 | Pazdirek et al. | 403/135 |
| 6,695,521 B2 | * | 2/2004 | Kincaid et al. | 403/132 |
| 6,902,341 B1 | * | 6/2005 | Rauschert | 403/43 |

(Continued)

FOREIGN PATENT DOCUMENTS

CH 503917 A * 2/1971

(Continued)

*Primary Examiner*—Daniel P Stodola
*Assistant Examiner*—Nahid Amiri
(74) *Attorney, Agent, or Firm*—McGlew and Tuttle, P.C.

(57) ABSTRACT

A stabilizer link or tie rod is provided with a ball and stud and with a housing with an outer surface and with an interior surface defining a ball cavity. The housing is connected with a link rod. A race insert is provided having a housing liner surface engaging the housing interior surface and an interior ball race surface in contact with the ball and a housing end portion defining a closure interface with the housing. A protective cap is provided with a barrier surface extending over the closure interface and over the housing outer surface. The cap has a retaining surface engaging each of the housing and the rod.

19 Claims, 7 Drawing Sheets

U.S. PATENT DOCUMENTS

2004/0165941 A1 * 8/2004 Yokota

FOREIGN PATENT DOCUMENTS

| DE | 33 08 457 | 9/1984 |
| DE | 36 39 962 | 6/1988 |
| DE | 44 20 488 | 12/1995 |
| FR | 1 121 570 | 8/1956 |

* cited by examiner

PROTECTED STABILIZER LINK OR TIE ROD AND BALL RACE PROTECTING CAP

FIELD OF THE INVENTION

The invention relates generally to ball joint links or tie rods and more particularly to a protected ball and socket joint such as a protected stabilizer link or protected tie rod with a connected part such as a link rod and a protective cap therefor.

BACKGROUND OF THE INVENTION

Stabilizer links, tie rods and other ball and socket joint structures typically have a housing with a bearing shell or similar insert, with the interior of the bearing being closed to the environment. U.S. Pat. No. 4,577,987 discloses a ball and socket joint with race inserts or socket parts that define the surface for contact with the ball. A cover cooperates with the housing at a housing interface. A bent over lip of the housing maintains the cover and the insert in position. U.S. Pat. No. 5,492,427 provides a cover maintaining the race insert in position and cooperating with the housing to provide a housing closure interface. U.S. Pat. No. 6,287,040 discloses a ball and socket joint with the bearing shell or race insert, housing and cover element cooperating to form a housing closure interface. The cover acts on the race insert to maintain it in position. Although these ball and socket joints have a housing cover or close off the bearing, providing structural integrity, the housing and cover interface that closes the housing are still subject to being hit by rocks and debris.

DE36 39 962 discloses a link with a ball joint. A housing closure cap closes a top opening of the housing and maintains the race insert (bearing shell) in position. The arrangement requires a clamping connection of the closure, the closure cap and the housing. The arrangement also has a housing and cover closure interface that is subject to being hit by rocks and debris.

DE 44 20 488 discloses a link with a ball joint. The closure interface includes a closure cap clamped on the housing as well as retaining rings cooperating with the various inserts including a bearing shell or race insert. The arrangement also has a housing and cover closure interface that is subject to being hit by rocks and debris.

U.S. Pat. No. 5,011,321 discloses a stabilizer link with a ball joint with a housing having a race insert or pillow ball seat (bearing shell) that extends above a cylindrical piece housing upper edge. A plastic disklike member is fitted and secured on the top wall portion of the seat member (race insert). The plastic disklike member cooperates with the housing itself for retaining the race insert or seat member and joins with the cylindrical piece housing to form a housing closure interface. The housing closure interface is subject to being hit by rocks and debris.

U.S. Pat. No. 5,613,792 discloses a ball joint with a plastic housing connected to a metal rod. A plastic race insert is in the form of a one-piece housing cover that is inserted into the plastic housing and supported in position via a connection to the rod. The housing and plastic race closure interface is subject to being hit by rocks and debris.

SUMMARY OF THE INVENTION

It is an object of the invention to provide a ball joint and link which is reliable, easy to manufacture and is protected during use. It is further an object of the invention to provide an effective and inexpensive protecting cap that can be easily applied to a link ball joint housing and which can be effectively maintained in position to protect the housing closure/race insert.

According to the invention, a stabilizer link or tie rod is provided with a ball and stud and a housing with an outer surface and with an interior surface defining a ball cavity. The housing is connected with a link rod. A race insert is provided having a housing liner surface engaging the housing interior surface and an interior ball race surface in contact with the ball and a housing end portion defining a closure interface with the housing. A protective cap is provided with a barrier surface extending over the closure interface and over the housing outer surface. The cap has a retaining surface engaging each of the housing and the rod.

The protective cap retaining surface may includes the barrier surface engaging the housing outer surface. The protective cap retaining surface preferably includes a rod retaining surface extending over a majority of a periphery of the rod and defining a smaller rod insertion gap. The cap is preferably flexible to generate a snap in retaining function as the rod is moved through the rod insertion gap and is seated in the rod retaining surface. In the seated state, the cap has an interference fit between the outer housing surface and the inner surface of the cap (the two having almost the same diameter). The cap seal against dirt, rocks, debris, etc. The cap may be made to create a static seal to seal against water, if such a seal is needed.

The barrier surface engaging the housing outer surface may have an interruption substantially aligned with the rod retaining surface to define a cap flexure axis. The cap, with its symmetrical design can flex so as to be seated with the barrier surface engaging the housing outer surface (providing the interference fit) and the rod retaining surface engaging the rod.

The stabilizer link may have a housing end cap. In this case the race end portion cooperates with the housing end plate to form the closure interface.

According to another aspect of the invention, a stabilizer link ball joint protecting cap is provided with a unitary molded body with a sealing portion providing a barrier surface extending in a first direction and a barrier surface extending in a second direction. The cap has a retaining surface including an arcuate shaped joint housing engaging surface and an enclosing rod engaging surface. The protective cap retaining surface may include the barrier surface engaging the housing outer surface.

According to another aspect of the invention, a process is provided for forming a protected stabilizer link. The process includes providing a ball with extending ball pin, providing a housing with an outer surface and with an interior surface defining a ball cavity and with a link rod connected to the housing. A race insert is disposed with housing liner surface engaging the housing interior surface and an interior ball race surface in contact with the ball to position the ball within the housing and with a housing end cap portion. A closure is formed between the race insert and the housing at a closure interface. A protective cap is provided. The protective cap is seated on the housing with a protective cap barrier surface extending over the closure interface and over a portion of the housing outer surface and with a retaining surface engaging each of the housing and the link rod.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
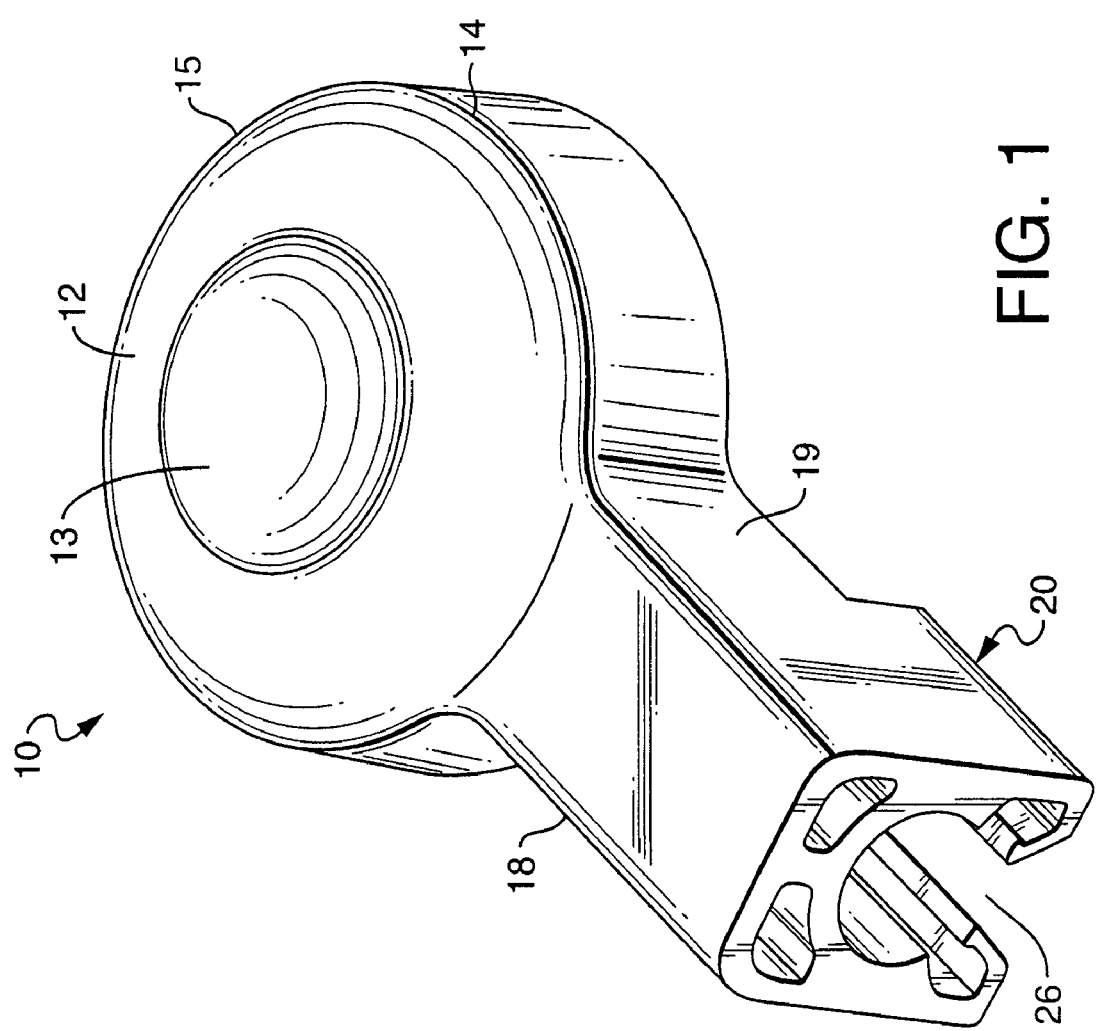
FIG. 1 is a top side perspective view of a protecting cap according to the invention.

Referring to the drawings in particular, FIG. 1 shows a protecting cap generally designated 10. The protecting cap 10 provides an outer top barrier surface 12 with an upper outer circular protruding part 13. The top barrier surface 12 extends generally in a first direction to cover the top of a stabilizer link housing 34. A housing side engaging surface or barrier and retaining surface 14 extends in a second direction, that is generally perpendicular to the first direction. The barrier and retaining surface 14 is arcuate and substantially coaxial with the outer circular protruding part 13. The barrier and retaining surface 14 transitions into the barrier surface 12 at the curved transition section 15.

Figure 2:
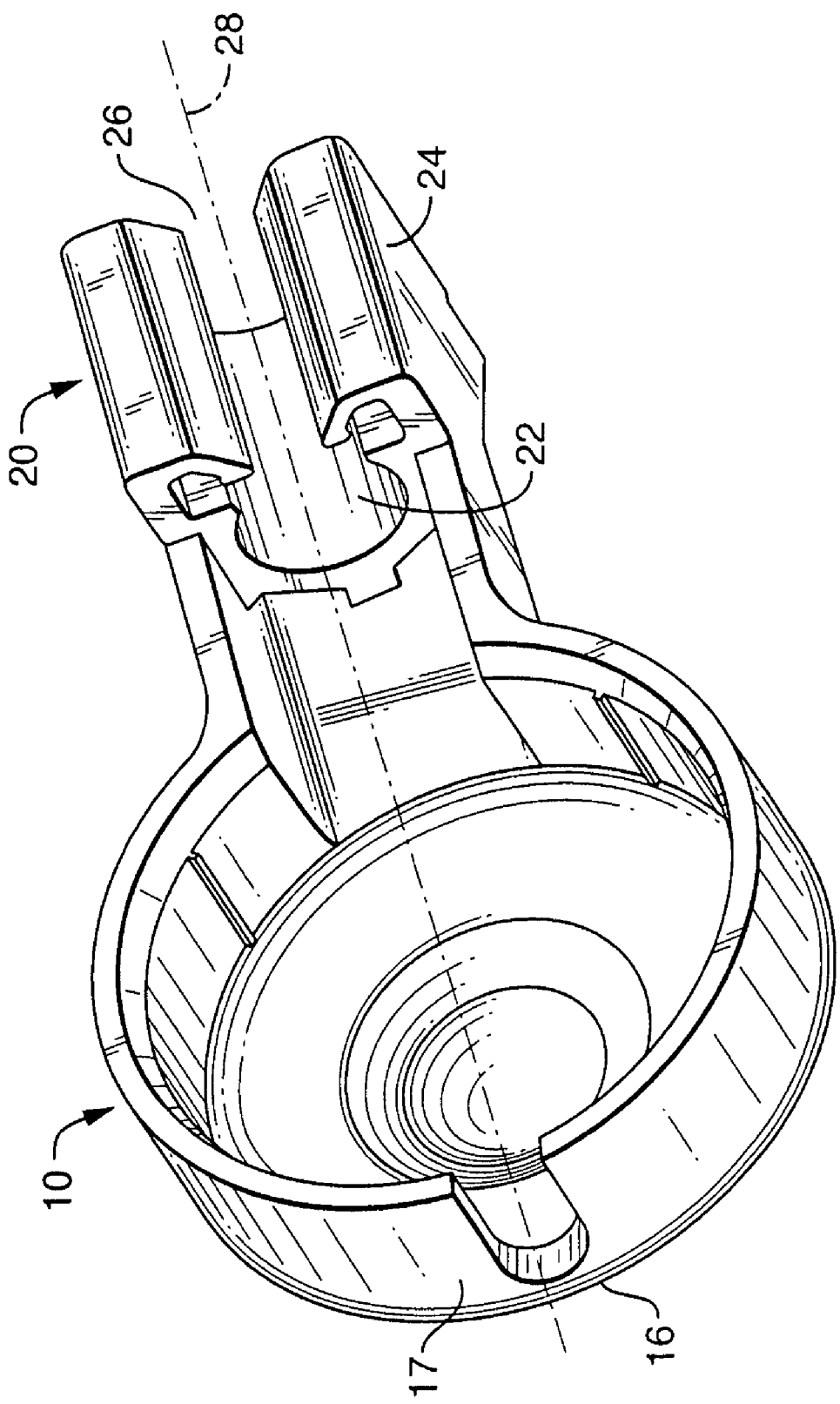
FIG. 2 is bottom front end view thereof.
Figure 3:
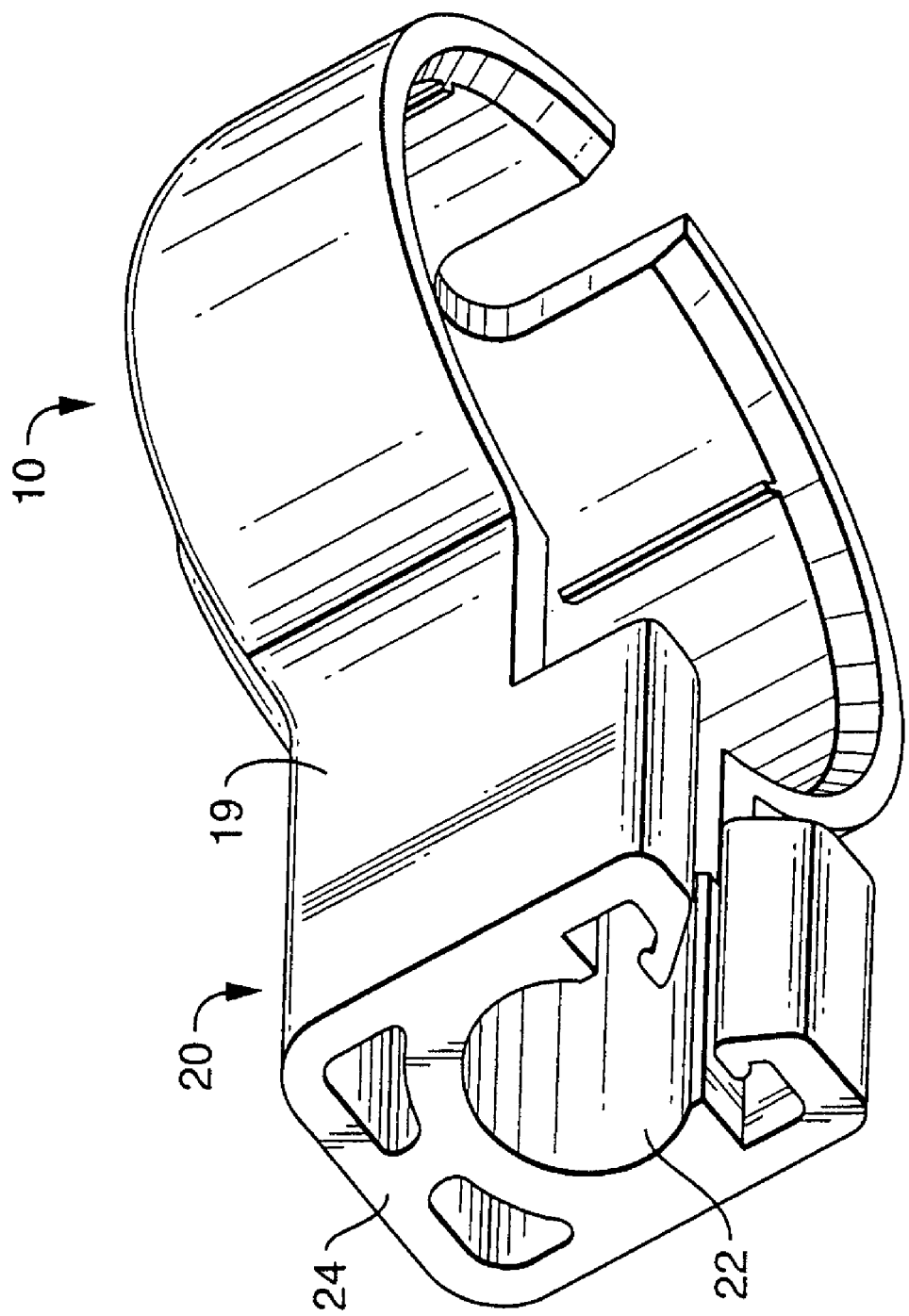
FIG. 3 is bottom rear end view thereof.

As can be seen in FIG. 2 and in FIG. 3, the cap 10 has an interruption, with a cut out U shape. This U shape cut out is provided with side barrier surface portion 16 above the interruption and the side barrier surface portions 17 to the side of the interruption.

The cap 10 has a housing/rod protection extension 18, extending away from the outer circular protruding part 13. A housing/rod protection skirt portion 19 extends down from each side of the extension 18. The extension 18 and skirt portions 19 connect the barrier surfaces 12 and 14 to a rod engagement structure 20. The rod engagement structure 20 comprises a rod retaining surface structure 22 and outer engagement support structure 24. The rod retaining surface structure 22 is sized to extend around a majority of the periphery of the rod 42 so as to engage the peripheral surface of the rod 42. The structure 22 defines a gap 26 that is smaller than the extent of the retaining surface of structure 22. This requires that the engagement structure 20 be somewhat flexible so that it snaps on to the rod 42.

The cap 10 is made of a plastic material and is advantageously a unitary molded part. The cut out interruption in the sealing and retaining surface 14 and the geometry of the rod engagement structure and the overall symmetrical design of the cap 10 provide for a cap flexure axis 28. The cap can flex somewhat about the axis 28, allowing the application of the cap with a flexing apart of the engagement structure 20 and a flexing apart of opposite sealing and retaining walls 14. After the cap 10 is seated, the surface 14 flexes back and retains the cap to the housing (an interference fit is formed) and the retaining surface of structure 22 snaps around the rod 42.

Figure 4:
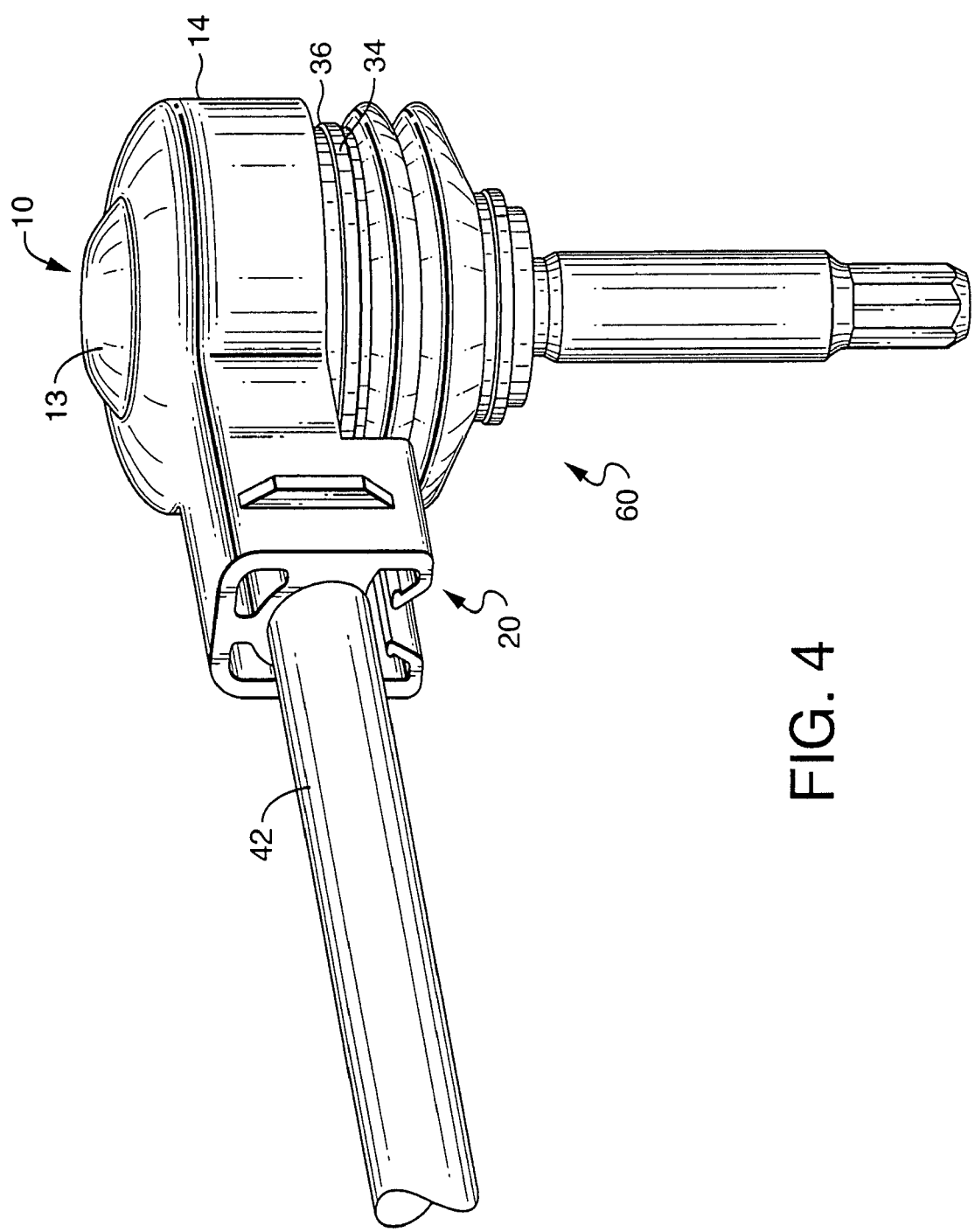
FIG. 4 is rear side view of the protected stabilizer link according to the invention.

FIG. 4 shows the protective cap 10 applied to a stabilizer link 60 to form a protected stabilizer link. The engagement structure 20 is in a position with the rod retaining surface structure 22 snapped around a rod 42. The diameter of the rod 42 substantially matches the diameter of the interior of the rod retaining surface structure 22. The diameter of the rod 42 is greater than of the dimension of gap 26 such that cap 10 remains in position relative to the rod 42. The arcuate shape of sealing and retaining walls 14 allow them to achieve a good retaining action as to the housing outer surface 36 of housing 34.

Figure 5:
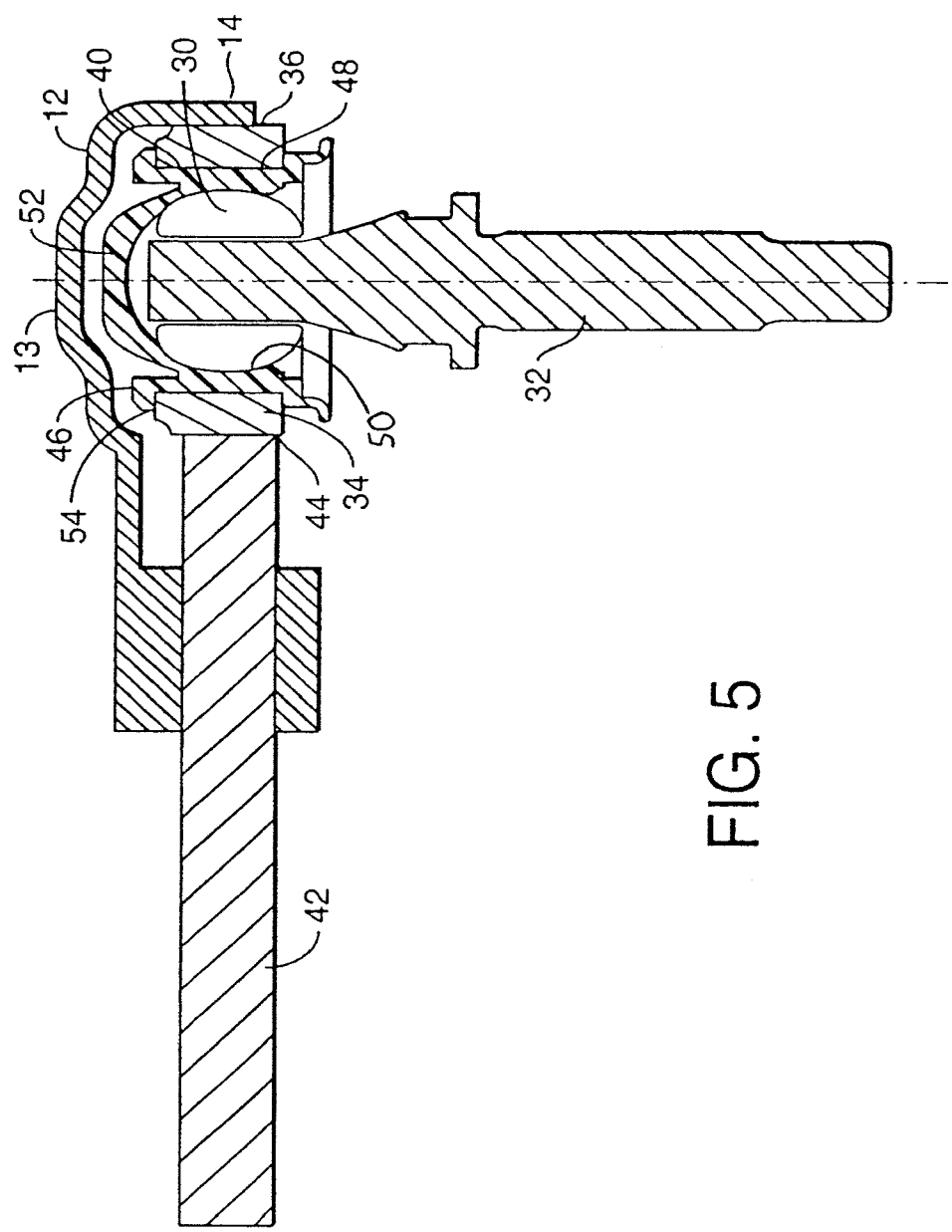
FIG. 5 is a sectional view of a protected stabilizer link.

FIG. 5 shows a cross-sectional view of the stabilizer link 60 including ball 30 with a stud/pin 32. The ball 30 and stud/pin 32 may be a single integral piece or formed with separate ball and stud parts. The housing 34 has an outer housing surface 36 and a housing interior surface 38 defined in a ball cavity 40. The housing 34 is connected to the link rod 42, by a weld or the like at a link housing interface 44 or the housing 34 and link rod 42 are connected by being formed integral, as one piece. A race insert or bearing shell 46 is inserted in the ball cavity 40 with the housing liner surface 48 of the race insert 46 in contact with the housing interior surface 38. The race insert 46 has interior ball race surface 50 in contact with the outer surface of the ball 30. The race insert 46 also has an end portion or upper portion 52. The race insert 46 is molded in position in the ball cavity 40 of the housing 34 and has a closure interface 54 where it meets the housing 34. The cap 10 is connected to the stabilizer link 60 with the rod retaining surface structure 22 engaging the rod 42. The cap 10 maintains its position relative to the rod 42 with the help of outer engagement support structure 24, which extends below the rod 42. The cap 10 also maintains its position based on the retaining surface 14. Further, the flexible nature of the cap 10 allows it to be flexed somewhat about its flexure axis 28, thereby allowing it to be seated with surface 14 extending over housing outer surface 36 and with the rod with 42 snapped into rod retaining surface 22.

Figure 6:
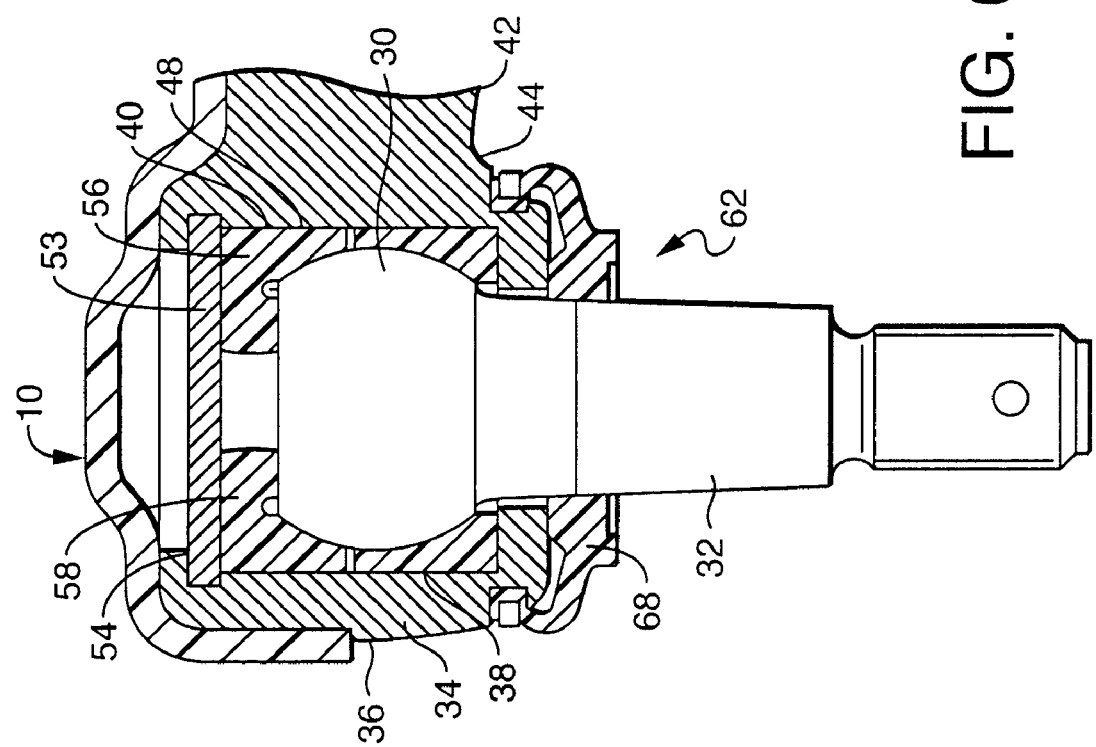
FIG. 6 is a sectional view of a protected stabilizer link of an alternative design.

FIG. 6 shows a cross-sectional view of the alternative design for a stabilizer link 62. The link 62 of the embodiment of FIG. 6 has a housing 34 transitioning at 44 to a rod 42. The housing 34 has an outer surface 36 and an inner surface 38. A ball 30 is provided with all pin 32. The race insert or bearing shell 56 is somewhat different from the plastic race insert 46 of the embodiment of FIG. 5. The race insert 56 has a surface in contact with the ball 30. The race insert 56 also has a top 58 held in position by a housing end cap 53. The housing end cap 53 is held by an outer lip of the housing 34 which is pushed over the end cap 53 to retain it in position relative to the housing 34 at the housing closure interface 54.

Figure 7A:
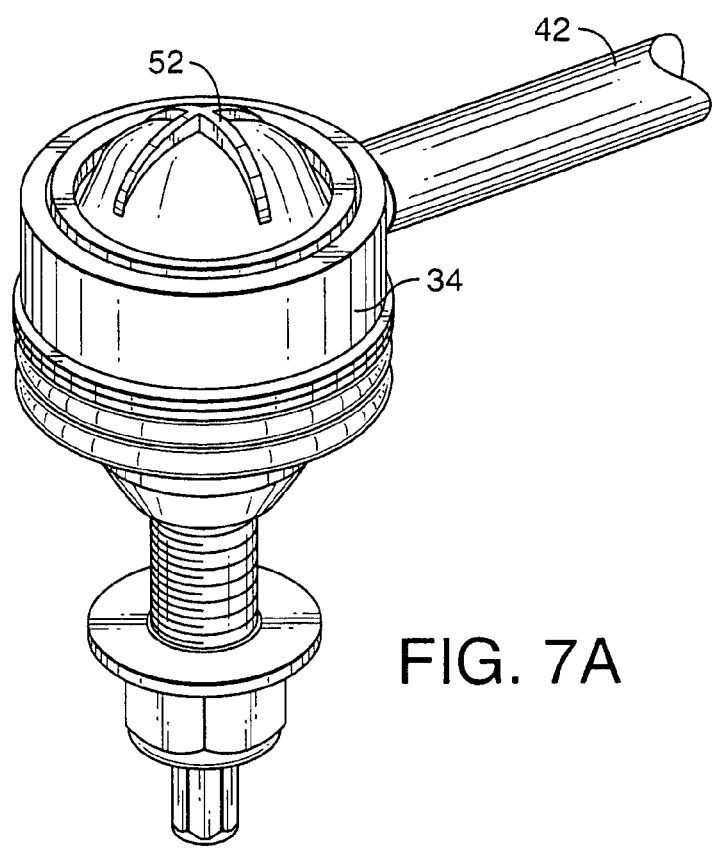
FIG. 7A is a front side view of the stabilizer link of FIG. 5 before application of the protective cap.
Figure 7B:
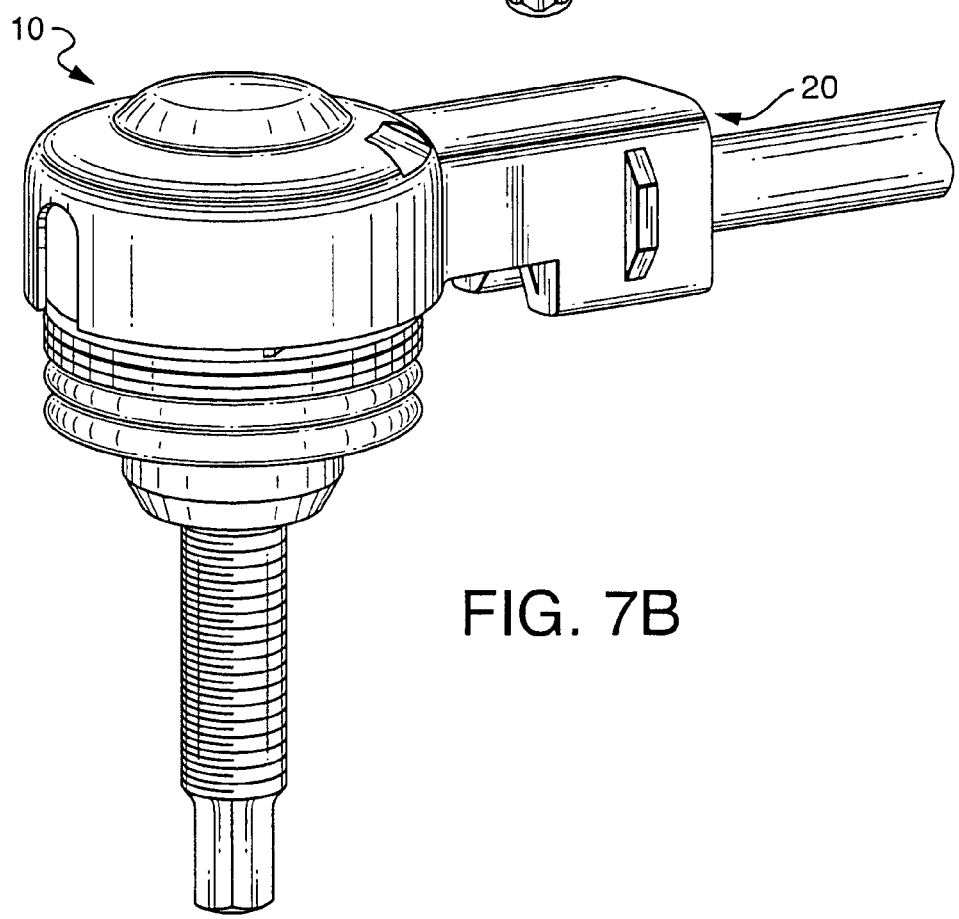
FIG. 7B is a front side view of the protected stabilizer link, after application of the protective cap.

FIG. 7A shows the stabilizer link 60 of the embodiment of FIG. 5, prior to the application of the protecting cap 10. The protecting cap 10 is deployed according to a method of the invention in which the protecting cap 10 is flexed to seat it with the retaining surface 14 extending over the housing outer surface 36 and to snap the structure 20 onto the rod 42 as shown in FIG. 7B.

While specific embodiments of the invention have been shown and described in detail to illustrate the application of the principles of the invention, it will be understood that the invention may be embodied otherwise without departing from such principles.

APPENDIX

List of Reference Symbols 10 protective cap
12 outer (top) barrier surface
13 outer circular protruding part
14 housing side engaging barrier and retaining surface 15 curved transition section
16 side barrier surface and retaining surface above interruption
17 side sealing and retaining surface at side of interruption;
18 housing/rod protection extension
19 housing/rod protection skirt
20 rod engagement structure
22 rod retaining surface structure
24 outer engagement support structure
26 rod insertion gap
28 cap flexure axis
30 ball
32 stud/pin
34 housing
36 housing outer surface
38 housing interior surface
40 ball cavity
42 link rod
44 link housing interface
46 race insert (bearing shell)
48 housing liner surface
50 interior ball race surface
52 race upper cap portion
53 housing closure cap
54 closure interface
56 alternate race insert
58 alternate upper race portion
68 bellows

What is claimed is:

1. A stabilizer link or tie rod, comprising:
a ball and stud;
a housing with an outer surface and with an interior surface defining a ball cavity;
a link rod connected to the housing;
a race insert with housing liner surface engaging the housing interior surface and an interior ball race surface in contact with the ball and a housing end portion defining a closure interface with the housing; and
a protective cap with a retainer surface extending over said closure interface and over said housing outer surface, said cap having a retaining surface portion engaging each of said housing and said rod, said retaining surface including a rod retaining surface extending over a majority of a periphery of said rod and with spaced apart ends forming a rod insertion gap that is smaller than a diameter of said rod to generate a snap in retaining function as said rod is moved through said rod insertion gap and is seated in said rod retaining surface, said cap being flexible to generate said snap in retaining function as said rod is moved through said rod insertion gap and is seated in said rod retaining surface, said retaining surface having an interruption substantially aligned with said rod retaining surface to define a cap flexure axis with said cap flexing such that said cap is seated with said retaining surface engaging said housing outer surface and said rod retaining surface engaging said rod, said rod insertion gap being located on one side of said housing, said interruption being located on another side of said housing, wherein said rod insertion gap is located opposite said interruption.

2. A stabilizer link according to claim 1, further comprising a housing end plate wherein a portion of said race insert cooperates with said housing end plate to form said closure interface.

3. A stabilizer link according to claim 1, wherein said interruption is a cut out interruption in said retaining surface.

4. A stabilizer link according to claim 3, wherein said interruption has a cut out U shape.

5. A stabilizer link according to claim 4, wherein said U shape cut out has a side barrier surface portion located at a position above said interruption and side barrier surface portions located adjacent to said interruption.

6. A stabilizer link according to claim 3, wherein said retaining surface has retaining walls engaging said housing, one retaining wall being opposite another retaining wall, said one retaining wall and said another retaining wall being flexible such that said one retaining wall and said another retaining wall are movable with respect to said cap flexure axis.

7. A stabilizer link according to claim 3, wherein said cap is composed of plastic material.

8. A stabilizer link according to claim 3, wherein said interruption is located at an axial end of said cap.

9. A ball joint, comprising:
a ball with pin;
a housing with an outer surface and with an interior surface defining a ball cavity, said housing having a connected member;
a race insert with housing liner surface facing the housing interior and an interior ball race surface receiving said ball and an end cap portion defining a closure interface with said housing at a location spaced from said outer surface;
a protecting cap with a retaining surface extending over said closure interface in a first direction and over said housing outer surface in a second direction, said protecting cap having a retaining surface portion for detachably engaging each of said housing and said housing connected member, said protecting cap retaining surface including a connected member retaining surface extending over a majority of a periphery of said connected member and with spaced apart ends forming a connected member insertion gap that is smaller than a diameter of the connected member to generate a snap in retaining function as said connected member is moved through said connected member insertion gap and is seated in said connected member retaining surface, said retaining surface having an opening located at one side of said housing, said connected member insertion gap being located at another side of said housing, said opening being located opposite said connected member insertion gap such that said opening is substantially aligned with said connected member insertion gap.

10. A ball joint according to claim 9, wherein said retaining surface has an arcuate portion in contact with said outer housing surface.

11. A ball joint according to claim 9, wherein said connected member is a rod of a stabilizer link or a tie rod.

12. A ball joint according to claim 9, wherein said protecting cap is formed as a cup-shaped structure.

13. A ball joint according to claim 9, wherein an area of said housing projects from said protecting cap.

14. A ball joint according to claim 9, wherein a bellows is arranged between said housing and said pin, said bellows being separated from said protecting cap.

15. A ball joint according to claim 9, wherein said protecting cap barrier surface has an interruption substantially aligned with a rod retaining surface to define a cap flexure axis with said cap flexing to be seated with said retaining surface engaging said housing outer surface and said rod retaining surface engaging said rod.

16. A stabilizer link or tie rod, comprising:
a ball and stud;

a housing with an outer surface and with an interior surface defining a ball cavity;

a link rod connected to the housing;

a race insert with housing liner surface engaging the housing interior surface and an interior ball race surface in contact with the ball and a housing end portion defining a closure interface with the housing; and a protective cap with a retaining surface extending over said closure interface and over said housing outer surface, said cap having a retaining surface portion engaging each of said housing and said rod, said protective cap retaining surface including a rod retaining surface extending over a majority of a periphery of said rod and defining a smaller rod insertion gap, said cap being flexible to generate a snap in retaining function as said rod is moved through said rod insertion gap and is seated in said rod retaining surface, said retaining surface engaging said housing outer surface having an interruption substantially aligned with said rod retaining surface to define a cap flexure axis with said cap flexing so as to be seated with said retaining surface engaging said housing outer surface and said rod retaining surface engaging said rod, said interruption being located at one side of said housing, said rod insertion gap being located at another side of said housing such that said rod insertion gap is located opposite said interruption.

17. A ball joint according to claim 16, wherein said interruption is a cut out interruption in said retaining surface.

18. A ball joint, comprising:

a ball with pin;

a housing with an outer surface and with an interior surface defining a ball cavity, said housing having a connected member;

a race insert with housing liner surface facing the housing interior and an interior ball race surface receiving said ball and an end cap portion defining a closure interface with said housing at a location spaced from said outer surface;

a protecting cap with a retaining surface extending over said closure interface in a first direction and over said housing outer surface in a second direction, said protecting cap having a retaining surface portion for detachably engaging each of said housing and said housing connected member, said retaining surface including a connected member surface extending over a majority of a periphery of said connected member, said connected member surface defining a connected member insertion gap, said retaining surface having an opening located opposite said connected member insertion gap, said opening being substantially aligned with said connected member insertion gap, said opening being located at one side of said housing, said connected member insertion gap being located at another side of said housing, wherein an area of said housing projects from said protecting cap.

19. A ball joint, comprising:

a ball with pin;

a housing with an outer surface and with an interior surface defining a ball cavity, said housing having a connected member;

a race insert with housing liner surface facing the housing interior and an interior ball race surface receiving said ball and an end cap portion defining a closure interface with said housing at a location spaced from said outer surface;

a protecting cap with a retaining surface extending over said closure interface in a first direction and over said housing outer surface in a second direction, said protecting cap having a retaining surface portion for detachably engaging each of said housing and said housing connected member, said retaining surface including a housing connected member retaining surface extending over a majority of a periphery of said housing connected member, said housing connected member retaining surface defining a housing connected member insertion gap located at a spaced location from said housing, said retaining surface having an opening located at a first side of said housing, said housing connected member insertion gap being located at a second side of said housing such that said housing connected member insertion gap is substantially aligned with said opening, wherein a bellows is arranged between said housing and said pin, wherein a bellows is arranged between said housing and said pin, said bellows being separated from said protective cap.

* * * * *